(12) United States Patent
Rupley et al.

(10) Patent No.: US 7,111,154 B2
(45) Date of Patent: Sep. 19, 2006

(54) METHOD AND APPARATUS FOR NOP FOLDING

(75) Inventors: Jeffrey P. Rupley, Round Rock, TX (US); Edward A. Brekelbaum, Austin, TX (US); Edward T. Grochowski, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 10/606,511

(22) Filed: Jun. 25, 2003

(65) Prior Publication Data

US 2004/0268087 A1 Dec. 30, 2004

(51) Int. Cl.
*G06F 9/30* (2006.01)
(52) U.S. Cl. .................................... 712/218
(58) Field of Classification Search ................ 712/24, 712/218
See application file for complete search history.

(56) References Cited

U.S. PATENT DOCUMENTS 5,893,143 A * 4/1999 Tanaka et al. .............. 711/120
5,895,487 A * 4/1999 Boyd et al. ................ 711/122

OTHER PUBLICATIONS

"PowerPC 603 Risc Microprocessor Technical Summary", Freescale Semiconductor, 1994, available at http://www.freescale.com/files/32bit/doc/data_sheet/MPC603.pdf.
"Heads and Tails: A Variable-Length Instruction Format Supporting Parallel Fetch and Decode", Heidi Pan and Krste Asanovic, International Conference on Compilers, Architecture, and Synthesis for Embedded Systems (CASES 2001), Atlanta, GA, Nov. 2001.
"High-Performance Variable-Length Instruction Encodings", Heidi Pan, M.Eng. Thesis, Massachusetts Institute of Technology, Jun. 2002.
"Instruction Fetch Mechanisms for VLIW Architectures with Compressed Encodings," Thomas M. Conte, et al., Proceedings of the 29th annual ACM/IEEE international symposium on Microarchitecture, Paris, France, pp. 201-211, 1996.

* cited by examiner

*Primary Examiner*—William M. Treat
(74) *Attorney, Agent, or Firm*—Shireen I. Bacon (57) ABSTRACT

Embodiments of an apparatus, method, and system provide for no-operation instruction ("NOP") folding such that information regarding the presence of a NOP instruction in the instruction stream is folded into a buffer entry for another instruction. Information regarding a target NOP instruction is thus maintained in a buffer entry associated with an instruction other than the target NOP instruction. For at least one embodiment, NOP information is folded into entries of a re-order buffer.

21 Claims, 5 Drawing Sheets

METHOD AND APPARATUS FOR NOP FOLDING

BACKGROUND

1. Technical Field

The present disclosure relates generally to information processing systems and, more specifically, to folding no-operation instruction ("NOP") information into buffer entries for other instructions.

2. Background Art

Microprocessors often use instruction pipelining to increase instruction throughput. An instruction pipeline processes several instructions through different stages of instruction execution concurrently, using an assembly line-type approach. These instructions may be executed in a dynamically scheduled (e.g., out-of-order) processor. For instructions that are allowed to execute out of order, the instructions are retired in their original program order. Until retirement, information regarding instructions executed out of order is maintained in a structure such as, for instance, a re-order buffer ("ROB"). In-order retirement of instructions that have been executed out of order allows for precise exception handling.

Some processors, such as the Itanium® and Itanium II® microprocessors available from Intel Corporation in Santa Clara, Calif., utilize Explicitly Parallel Instruction Computing (EPIC) technology to execute multiple instructions simultaneously in order to increase instruction throughput. In such processors, several instructions (e.g., three instructions) are grouped together into aligned containers called bundles. Each bundle includes three 41-bit instructions and a format code.

If a series of instructions to be executed by the processor does not fit into one of the templates indicated by a given format code, then a no-operation instruction (referred to herein as "NOP instruction" or simply "NOP") may be inserted into a bundle in order to execute one or two other instructions that do fit into the template. NOP instructions may also be inserted into a bundle for branch alignment reasons. If a relatively large percentage of NOP instructions appear in the code stream, computing resources may be inefficiently utilized.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for NOP folding.

DETAILED DESCRIPTION

Described herein are selected embodiments of an apparatus and method related to NOP folding. NOP folding refers to a method of maintaining information regarding a target NOP instruction in a buffer entry associated with an instruction other than the target NOP instruction.

In the following description, numerous specific details such as processor types, register lengths, and instruction formats have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

As is stated above, if a large number of NOP instructions are inserted into the instruction stream, certain resource utilization inefficiencies may result. For out-of-order ("OOO") processors, it is possible to free up some machine resources by declining to process NOP instructions. However, in such cases NOP instructions are still fetched and decoded.

Even if NOP instructions are not executed, they are nonetheless retired in program order. In order to facilitate in-order retirement, a standard component of many OOO processor microarchitectures is a re-order buffer ("ROB"). Placing a large number of NOP instructions into the ROB, even if the NOP instructions are not executed, creates inefficiencies by allocating ROB resources for unexecuted instructions. Embodiments of the method and apparatus disclosed herein address this and other concerns related to processing of NOP instructions.

Figure 1:
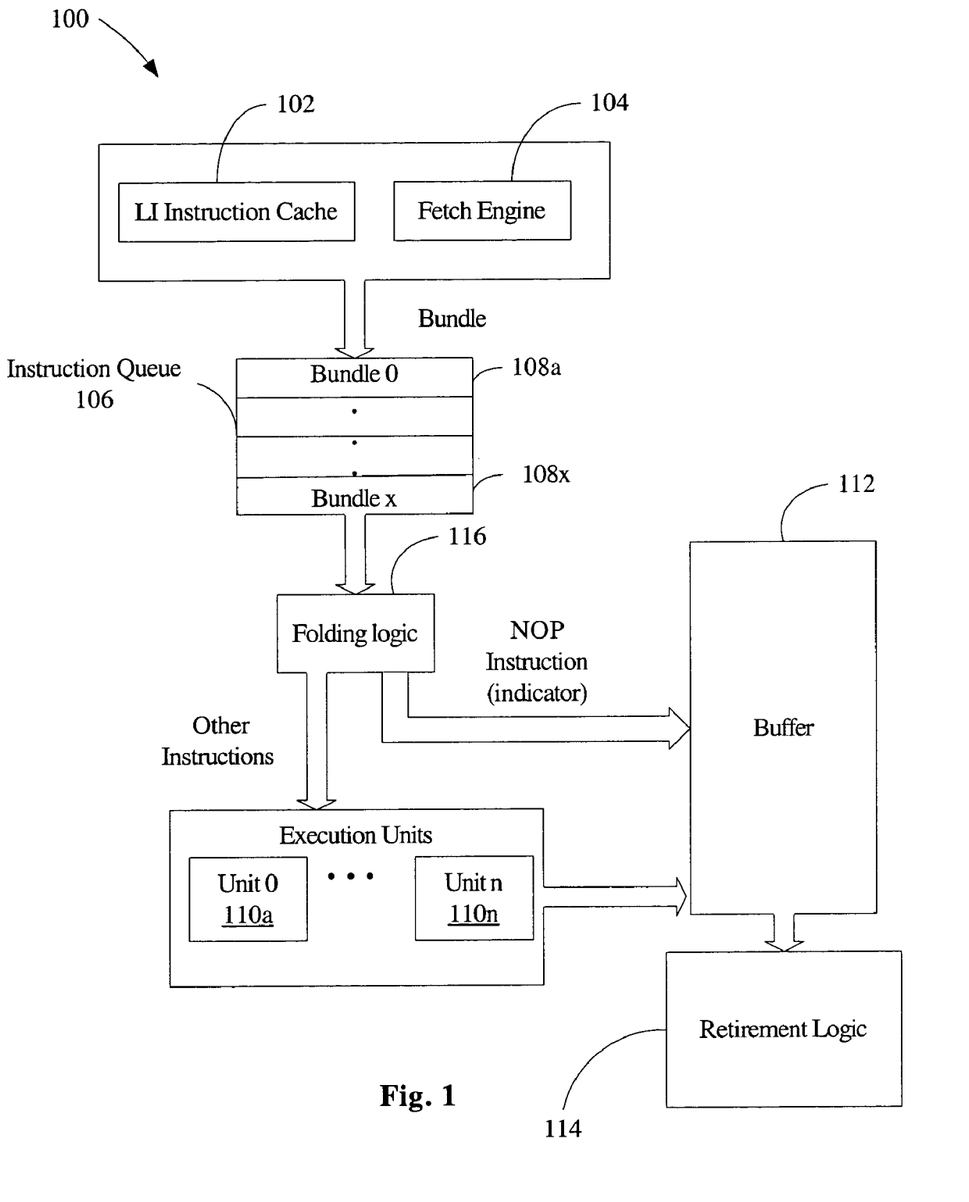
FIG. 1 is a block diagram illustrating at least one embodiment of a processor that may utilize disclosed techniques.

FIG. 1 is a block diagram illustrating at least one embodiment of an out-of-order processor 100. The processor 100 includes an instruction storage area 102, such as an L1 cache, for storing instructions. The processor 100 also includes a fetch engine 104 to fetch instructions from the storage area 102. The fetch engine 104 operates to retrieve a bundle from the storage area 102 and forward it to an instruction queue 106.

The instruction queue 106 is a memory storage structure that can hold one or more bundles 108a–108x. For at least one embodiment, the instruction queue 106 can hold up to eight (8) bundles. The format code in the template field of a bundle (described below) indicates which type of execution unit may process each instruction in the bundle. From the instruction queue, each non-NOP instruction in a bundle is forwarded to the appropriate execution unit 50 for execution.

As used herein, the term "bundle" in intended to mean a grouping of instructions. One skilled in the art will recognize that the number of instructions grouped together to form a bundle is not limited to three, and may be any number, including two and four. One of skill in the art will also recognize that a grouping of instructions may be considered a bundle, even if the grouping is known by another term, such as "very long instruction word" (VLIW).

For at least one embodiment, as non-NOP instructions are issued to their respective execution units 110a–110n they are assigned entries in the ROB 112 for any results they may generate. That is, a place is reserved in the ROB 112, which may be implemented as a queue, for each non-NOP instruction. For at least one embodiment, such allocation is performed by folding logic 116. Folding logic 116 need not necessarily be stand-alone logic as illustrated in FIG. 1. For instance, for at least one embodiment folding logic 116 is implemented as part of a decoder (not shown).

The logical order of instructions is maintained within the ROB 112. For at least one embodiment, the assigned entry in the ROB 112 will ultimately be filled in by a value as instruction execution proceeds. The value represents the result of the instruction. For at least one embodiment, when entries reach the head of the reorder buffer 112, provided they've been filled in with their actual intended result, they are removed, and each value is written to its intended architectural register (not shown). After the contents of a ROB 112 entry are written to a register, the instruction is retired by retirement logic 114.

The number of available entries in the ROB 112 may be limited. For at least one embodiment, the ROB 112 contains 256 entries. Declining to allocate an entry in the ROB 112 for NOP instructions allows the entries of the ROB 112 to be allocated for operational instructions. However, even when NOP instructions are not scheduled or executed, it may not be desirable to decline to track NOP instructions in the ROB 112. For instance, it may be useful to track NOP instructions in the ROB 112 for exception-reporting purposes since a NOP may catch an exception from a prior instruction. In addition, for performance-monitoring purposes it may be desirable for performance-monitoring logic to accurately count the number of retired instructions (including NOP instructions).

FIG. 1 illustrates that, in order to avoid inefficient utilization of execution units 110a–110n and ROB 112 entries, NOP instructions are not forwarded to the execution units 110a–110n for execution. Similarly, for most NOP instructions no entry in the ROB 112 is allocated. Instead, "folded" information regarding unexecuted NOP instructions is forwarded to the ROB 112 via folding logic 116. In this manner in-order NOP retirement is accommodated while conserving space in the ROB 112. Operation of the folding logic 116 is discussed in further detail below.

Figure 2:
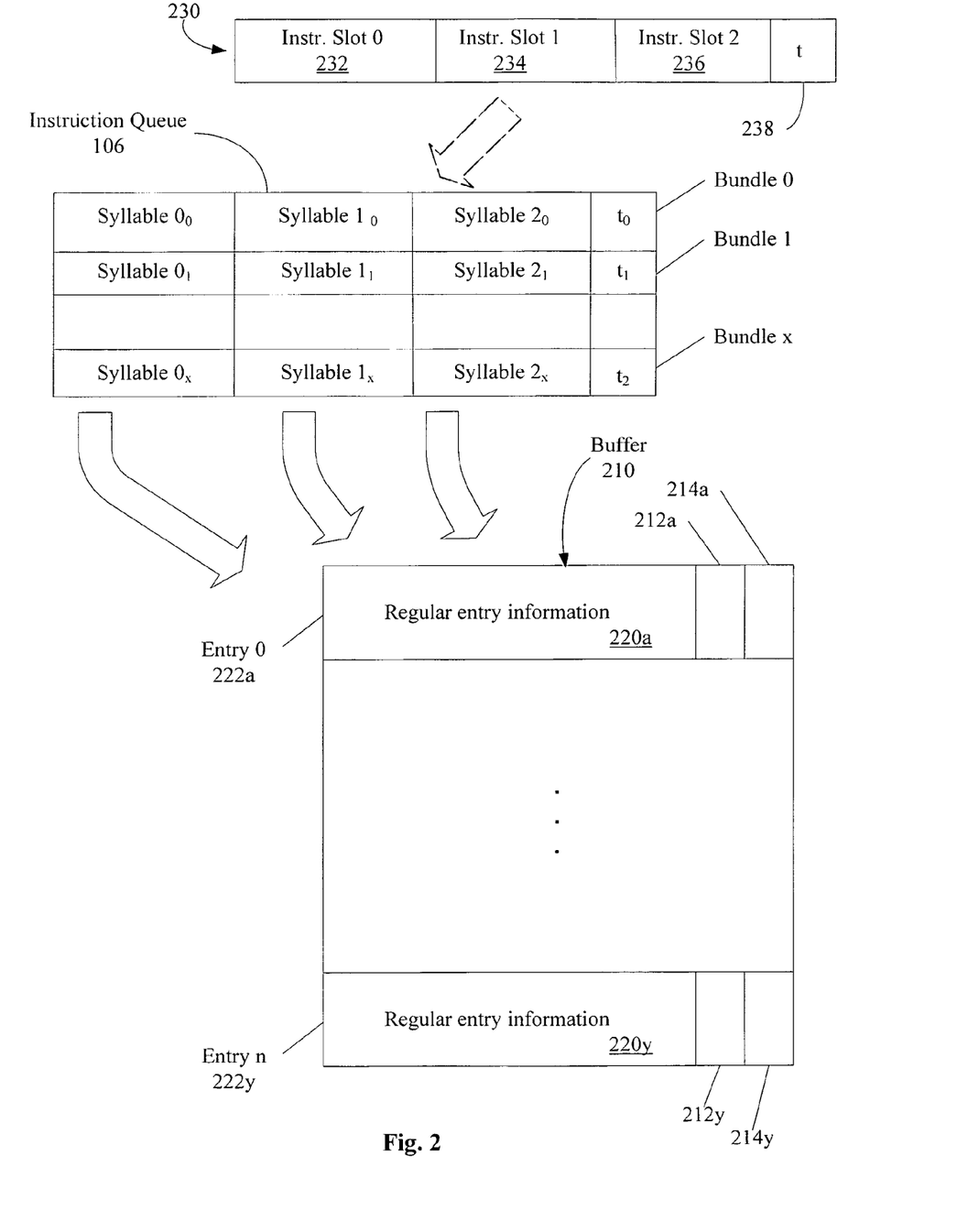
FIG. 2 is a block diagram further illustrating at least one embodiment of an instruction queue and at least one embodiment of a buffer capable of holding folded NOP data.

FIG. 2 illustrates at least one embodiment of a bundle format 230. For at least one embodiment, each bundle includes three 41-bit instruction slots 232, 234, 236 and a 5-bit template field 238. The value in the template field 238 specifies the mapping of the instruction slots to execution unit types.

FIG. 2 also illustrates that the bundles 108a–108x of the instruction queue 106 follow the bundle format 230. Three 41-bit instructions are grouped together into bundles that each include a format code. One skilled in the art will recognize that other formats may be utilized for a bundle. For example four instructions, or any other number of instructions, may be included in a bundle. Furthermore, each instruction may be of any size, such as 16 bits, 32 bits or any other length.

The instructions in each instruction slot of a bundle are referred to as "syllables." Within a bundle, execution order proceeds from syllable 0 to syllable 2.

FIG. 2 illustrates at least one embodiment of a buffer 210 whose entries 222a–222y are capable of holding folded NOP data. The entries of the buffer 210 illustrate bundle-level NOP folding. Each entry 222 of the buffer 210 includes an information field 220 for a syllable of a particular bundle as well as two NOP indicator fields 212, 214, one for each of the other syllables of the particular bundle. For an embodiment that implements buffer 210 as a ROB (such as, e.g., ROB 112 in FIG. 1), the information field 220 holds result information from the syllable instruction.

Reference is made to FIG. 2 for further discussion of fields in a buffer entry 222 for an instruction from a three-instruction bundle. If the information field 220a is allocated for syllable 0 of a bundle x, then the value in the first NOP indicator field 212a specifies the NOP status for syllable 1 of bundle x. Similarly, the value in the second NOP indicator field 214a specifies the NOP status for syllable 2 of bundle x. Of course, for at least one alternative embodiment the first NOP indicator 212 could specify the NOP status for syllable 2 and the second NOP indicator 214 can specify the NOP status for syllable 1 . Also, in alternative embodiments that include a larger number of instructions (such as four or more), the entries 222a–222n include additional NOP indicator bits.

Accordingly, the number of NOP indicator fields in a buffer entry may be driven by the number instructions defined for a bundle. For at least one embodiment, if a bundle includes n instructions, then a buffer entry includes n–1 NOP indicator fields in order to specify whether every other instruction in the bundle is a NOP. For a processor that utilizes two-instruction bundles, for example, only one NOP indicator bit is included in the buffer entry 222.

Table 1 illustrates at least one embodiment of the mapping of information specified by the contents of a buffer entry 222 for an instruction from a three-instruction bundle:

TABLE 1

| If contents of 220 is . . . | . . . then contents of 212 is NOP indicator for | . . . and the contents of 214 is NOP indicator for |
|---|---|---|
| Syllable 0 information | Syllable 1 | Syllable 2 |
| Syllable 1 information | Syllable 0 | Syllable 2 |
| Syllable 2 information | Syllable 0 | Syllable 1 |

The NOP indicator fields thus map to specific instruction slots, depending on the location (within the bundle) of the instruction for which the information field 220 has been allocated.

One will note that a potential double-marking problem exists when a single NOP appears in a bundle. For example, consider two sample bundles x and y that contain the following three instructions in their respective syllables 0, 1 and 2: x={add, NOP, sub} and y={add, sub, NOP}. Under the scheme illustrated in Table 1, the NOP in x might be recorded twice: once in field 212 for the add instruction and once in field 214 for the subtract instruction. Similarly, the NOP in y might be recorded twice: once in field 214 for the add instruction and once in field 214 for the subtract instruction.

To avoid such double-marking, a priority rule may be imposed on the setting of values for the NOP indicator fields 212, 214. For at least one embodiment, a rule is imposed such that a NOP in a bundle containing only one NOP instruction is recorded only in the entry 222 for the lowest-number syllable adjacent to the NOP. For the x={add, NOP, sub} example, the NOP is thus specified in NOP indicator field 212 for the add instruction (syllable 0 ) but is not specified in the entry 222 for the subtract instruction (syllable 2 ). Similarly, for the y={add, sub, NOP} example, the NOP is specified in NOP indicator field 214 for the subtract instruction. The NOP is not specified in a NOP indicator for the add instruction because the add instruction is not adjacent to the NOP.

It is important to note that a bundle may include only NOP instructions (i.e., {NOP, NOP, NOP}). In such cases, a rule may be applied such that only two of the three NOP instructions are folded. For example, the remaining NOP may be allocated a buffer entry 222, with each NOP indicator field 212, 214 reflecting the other two NOP instructions of the bundle.

For at least one embodiment, the NOP folding scheme discussed herein is an optional feature that may be disabled. Such flexibility is useful, for instance, when the processor is in single-step mode or when the processor has instruction breakpointing enabled. Turning off the NOP folding feature during such times avoids the potential problems with folding an instruction that should be executed in order to generate an exception.

Alternatively, for at least one embodiment NOP folding is not capable of being disabled. Instead, for each folded NOP instruction an additional indicator is maintained to specify whether any potential exceptions are indicated for the folded NOP instruction.

Table 2 illustrates at least one embodiment of a scheme for folding NOP data into buffer entries (such as 222, FIG. 2) for each of several possible bundle configurations. Buffer entries may be generated by folding logic 116 (FIG. 1) according to the scheme illustrated in Table 2. In Table 2, S0, S1 and S2 denote bundle syllables that contain an instruction other than a NOP instruction. The notation [Sx] indicates that a buffer entry is allocated for results of the instruction indicated in syllable Sx of a bundle. Values in parenthesis indicate values for the NOP indicator fields 212, 214, respectively. For at least one embodiment, a logic-high value (such as 1b'1') in a NOP indicator field represents a "present" value to denote existence of a NOP instruction in the bundle slot as specified in Table 1.

TABLE 2

| Bundle | Buffer entry for Syllable 0 | Buffer entry for Syllable 1 | Buffer entry for syllable 2 |
|---|---|---|---|
| S0, S1, S2 | [S0](0,0) | [S1](0,0) | [S2](0,0) |
| S0, S1, NOP | [S0](0,0) | [S1](0,1) | none |
| S0, NOP, S2 | [S0](1,0) | none | [S2](0,0) |
| NOP, S1, S2 | none | [S1](1,0) | [S2](0,0) |
| S0, NOP, NOP | [S0](1,1) | none | none |
| NOP, S1, NOP | none | [S1](1,1) | none |
| NOP, NOP, S2 | none | none | [S2](1,1) |
| NOP, NOP, NOP | [S0](1,1) | none | none |

Consider the following example. A series of three consecutive bundles in an instruction queue (such as 106, FIG. 1) contain the following instructions:
ldf, NOP, fadd
NOP,fmpy,add
NOP,NOP,br For a processor that places each instruction, including NOP instructions, in a ROB or other buffer, the preceding series of instructions would generate nine (9) buffer entries. For a processor that utilizes an embodiment of the NOP folding techniques described herein, the following buffer entries 222 are generated by folding logic 116:
ldf (1,0)
fadd (0,0)
fmpy (1,0)
add (0,0)
br (1,1)

Accordingly, only five (5) buffer entries 222 are generated, with the additional 4 NOP instructions being "folded" into the buffer entries for the other instructions.

One skilled in the art will recognize that buffer 210 may be any structure that holds instruction-specific data, such as a ROB (112, FIG. 1). For embodiments where the buffer 210 is implemented as a ROB, the information field 220 is allocated for results of the instruction. A NOP folding scheme using NOP indicator bits (such as 212 and 214 in FIG. 2) may be used with other types of buffers as well. For example, for at least one alternative embodiment buffer 210 may be implemented as a trace cache for instruction fetching. In such embodiment, the information field 220 of the buffer may contain decoded instructions or may contain micro-operations.

Figure 3:
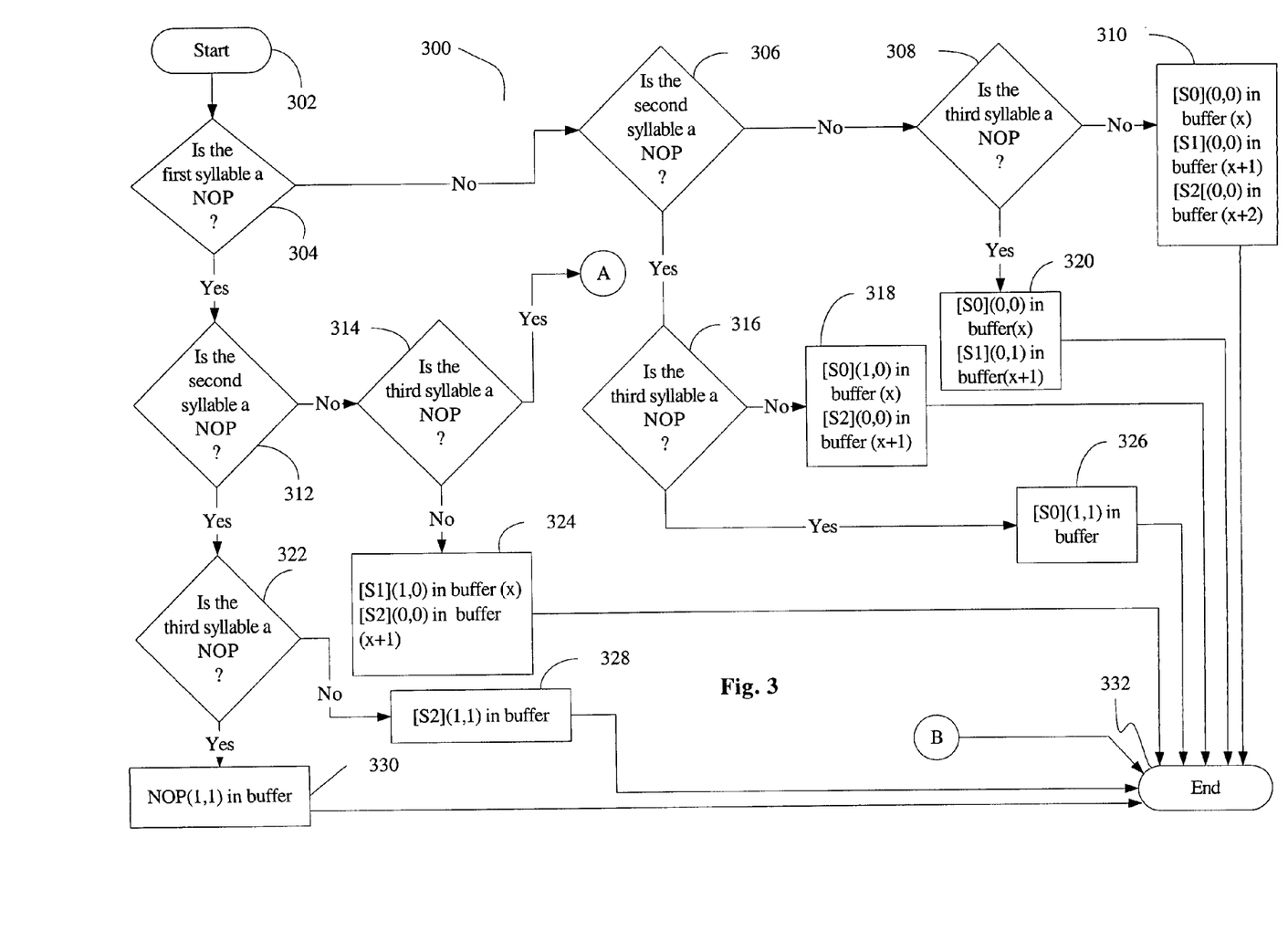
FIGS. 3 and 4 are flowcharts illustrating at least one embodiment of a method for folding NOP information into buffer entries for other instructions.
Figure 4:
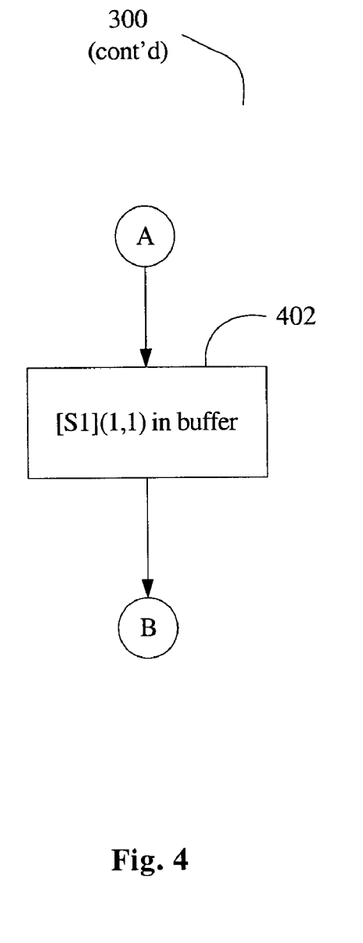

FIGS. 3 and 4 are flowcharts illustrating at least one embodiment of a method 300 for folding NOP information into buffer entries for other instructions. For at least one embodiment, the method 300 is performed by folding logic, such as folding logic 116 illustrated in FIG. 1. While the embodiment 300 illustrated in FIGS. 3 and 4 performs folding for a three-instruction bundle, one of skill in the art will recognize that the method may easily be modified to perform NOP folding for bundles of other lengths. One of skill in the art will further recognize that the blocks of FIGS. 3 and 4 may be performed in a different order without straying from the illustrated functionality, and that one or more blocks may be implemented with logic that performs multiple blocks simultaneously.

FIG. 3 illustrates that the method 300 begins at block 302. Processing proceeds in order to determine the contents of a bundle (such as, for example, an entry of an instruction queue such as 106 in FIG. 1) and to allocate buffer 210 (FIG. 2) entries. It is assumed that the allocated entry includes some indicator to specify for which syllable in a bundle the entry has been allocated.

FIGS. 2, 3 and 4 are referenced to discuss the method 300. The method 300, as is discussed in further detail below, determines the number of NOPs in a bundle, allocates buffer entries 222, and sets values for NOP indicator bits 212, 214. If none of the instructions in a bundle are NOP instructions, a buffer entry 222 is allocated for each instruction in the bundle. If all of the instructions in a bundle are NOP instructions, an entry 222 is allocated for one of the NOP instructions and the other two NOP instructions are "folded" into that entry 222. If the number of NOP entries is greater than zero but less than the number of instructions in a bundle, then a buffer entry 210 is allocated for each non-NOP entry and the NOP instruction(s) is folded into a non-NOP entry. As used herein, "allocating a buffer entry" for an instruction is intended to indicate that the instruction information field 220 of the allocated entry 222 is allocated for results, if any, of the instruction.

At block 304 it is determined whether the first syllable of a bundle indicates a NOP instruction. If so, processing proceeds to block 312 to determine if the second syllable of the bundle indicates a NOP instruction. If so, processing proceeds to block 322 to determine if the third syllable of the bundle indicates a NOP instruction. If so, then it has been determined that all three instructions in the bundle are NOP instructions. As is stated above, it may be desirable in such cases to allocate an entry in the buffer 210 for one of the NOP instructions. Accordingly, at block 330 an entry 222 is allocated in the buffer 210 for a NOP instruction in the bundle. Then, the allocated entry's 222 NOP indicator bits 212, 214 are set with a "present" value to indicate that both of the other instructions in the bundle are NOP instructions. Processing ends at block 332.

If it is determined at block 312 that the second syllable of the bundle is not a NOP, then processing proceeds to block 314 to determine if the third syllable of the bundle is a NOP. If so, then it is determined that the bundle contains two NOP instructions in the format {NOP,S1,NOP}. Processing proceeds to A in FIG. 4.

Brief reference to FIG. 4, along with FIG. 2, illustrates that at block 402 an entry is allocated in the buffer 210 for the second syllable (S1) of the bundle. At block 402, NOP indicator fields 212, 214 are set with a "present" value to indicate that both of the other syllables in the bundle (besides second syllable S1) contains a NOP instruction. Processing proceeds to B in FIG. 3 and ends at block 332.

If it is determined at block 314 that the third syllable of the bundle is not a NOP instruction, then it is determined that the bundle contains one NOP instruction in the format {NOP,S1,S2}. Processing proceeds to block 324, wherein an entry is allocated in the buffer 210 for each of the non-NOP instructions. A first entry, entry x, is allocated for the first non-NOP instruction in syllable S1. The first NOP indicator field 212 for entry x is set with a "present" value to indicate that the instruction in syllable S0 is a NOP instruction. The second NOP indicator field for entry x is set to a "not present" value. A second entry, entry x+1, is allocated in the buffer 210 for the second non-NOP instruction in syllable S2. Neither of the NOP indicator fields 212, 214 for entry x+1 are set with a "present" value. Processing ends at block 332.

If it is determined at block 322 that the third syllable is not a NOP instruction, then it is determined that the bundle contains two NOP instructions in the format {NOP, NOP, S2}. Processing proceeds to block 328, wherein an entry is allocated in the buffer 210 for the non-NOP instruction in syllable S2. Both NOP indicator field 212, 214 for the entry are set with a "present" value to indicate that the instructions in the remaining two syllables are NOP instructions. Processing ends at block 332.

If it is determined at block 304 that the first syllable of the bundle does not indicate a NOP instruction, then processing proceeds to block 306 to determine if the second syllable of the bundle indicates a NOP instruction. If so, then processing proceeds to block 316 to determine if the third syllable of the bundle indicates a NOP instruction. If not, then it is determined that the bundle contains one NOP instruction in the format {S0, NOP, S2} and processing proceeds to block 318. At block 318 an entry is allocated for each non-NOP instruction in the bundle. A first entry, entry x, is allocated for the first non-NOP instruction in syllable S0. The first NOP indicator field 212 is set with a "present" value to indicate that the instruction in syllable S1 is a NOP instruction. The second NOP indicator field for entry x is set to a "not present" value. A second entry, entry x+1, is allocated in the buffer 210 for the second non-NOP instruction in syllable S2. Neither of the NOP indicator fields 212, 214 for entry x+1 are set with a "present" value (assuming use of the rule that a NOP will be indicated in the entry for a syllable adjacent to the NOP). Processing ends at block 332.

If it is determined at block 316 that the third syllable of the bundle does indicate a NOP instruction, then the bundle includes two NOP instructions and one non-NOP instruction in the format {S0, NOP, NOP} and processing proceeds to block 326. At block 326 an entry in the buffer 210 is allocated for the non-NOP instruction in syllable S0. The first and second NOP indicator fields 212, 214 are set with a "present" value to indicate the two NOP instructions in the bundle. Processing ends at block 332.

If the second-syllable NOP check at block 306 evaluates to false, then processing proceeds to block 308 to determine if the bundle has a NOP in its third syllable. If not, then the bundle contains no NOP instructions and processing proceeds to block 310. At block 310, three entries in the buffer 210 are allocated, one for each instruction in the bundle. Each NOP indicator field 212, 214 for each of the allocated entries is set to a "not present" value to indicate the absence of NOP instructions in the bundle. Processing ends at block 332.

If the third-syllable NOP check at block 308 evaluates to "true," then the bundle includes one NOP instruction in the format {S0, S1, NOP}, and processing proceeds to block 320. At block 320, two entries are allocated in the buffer 210, one for each non-NOP instruction in the bundle. A first entry, entry x, is allocated for the first non-NOP instruction in syllable S0. The first and second NOP indicator fields 212, 214 for entry x are set with a "not present" value (assuming use of the rule that a NOP will be indicated in the entry for a syllable adjacent to the NOP). A second entry, entry x+1, is allocated in the buffer 210 for the second non-NOP instruction in syllable S2. The first NOP indicator field 212 for entry x+1 is set with a "not present" value. The second NOP indicator field 214 for entry x+1 is set with a "present" value to indicate the NOP instruction in syllable S2. Processing ends at block 332.

One skilled in the art will recognize that, depending on the initialization scheme employed for the NOP indicator fields 212, 214, some values may be preset and need not be set as indicated in FIGS. 3 and 4. For instance, if the values of the NOP indicator field 212, 214 for each buffer entry 222 is preset to zero, then at blocks 318, 320, 310 and 402, "not present" values need not be written to the NOP indicator fields 212, 214 (assuming that a logic-low value represents a "not present" indication).

Figure 5:
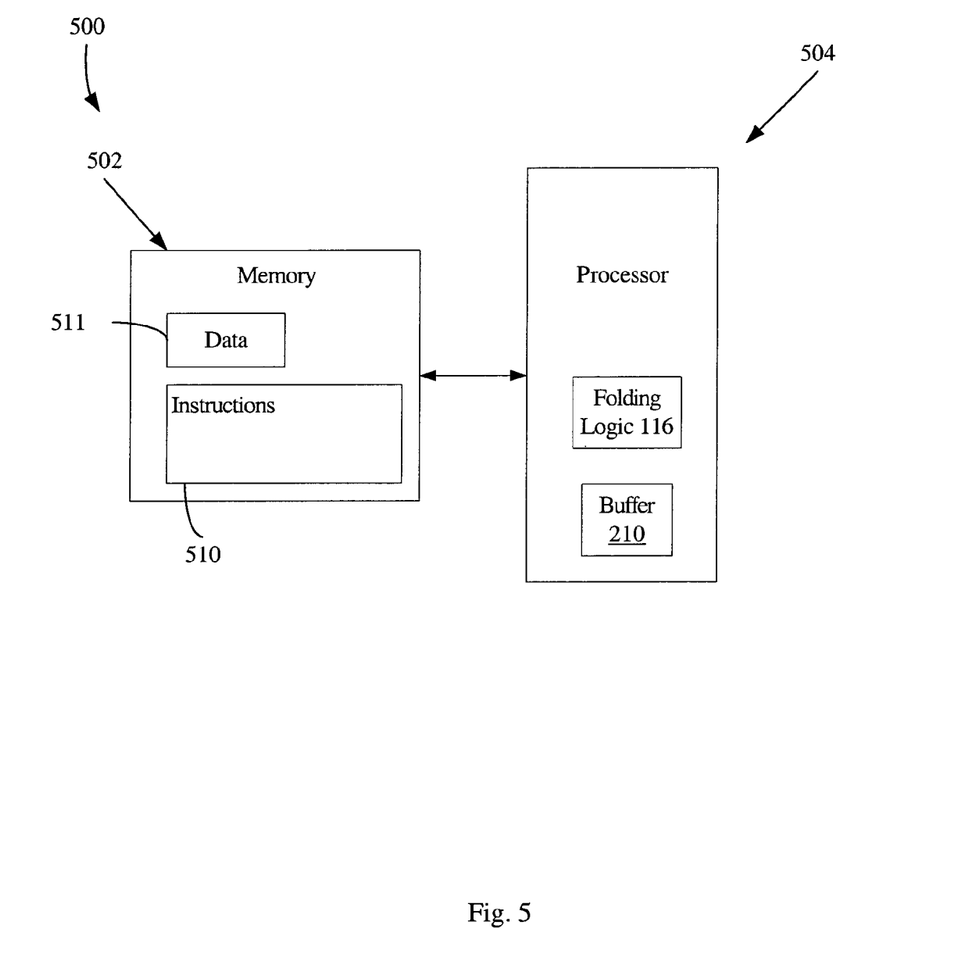
FIG. 5 is a block diagram of at least one embodiment of a processing system that may perform NOP folding.

FIG. 5 illustrates at least one embodiment of a processing system 500 that may utilize disclosed techniques. System 500 may be used, for example, to execute a method for folding NOP data, such as the embodiments described herein. For purposes of this disclosure, a processing system includes any system that has a processor, such as, for example; a digital signal processor (DSP), a microcontroller, an application specific integrated circuit (ASIC), or a microprocessor. System 500 is representative of processing systems based on the Itanium® and Itanium® II microprocessors as well as the Pentium®, Pentium® Pro, Pentium® II, Pentium® III, Pentium® 4 microprocessor, all of which are available from Intel Corporation. Other systems (including personal computers (PCs) having other microprocessors, engineering workstations, personal digital assistants and other hand-held devices, set-top boxes and the like) may also be used. In one embodiment, system 500 may be executing a version of the Windows™ operating system available from Microsoft Corporation, although other operating systems and graphical user interfaces, for example, may also be used.

Referring to FIG. 5, processing system 500 includes a memory system 502 and a processor 504 that includes folding logic 116 and a buffer 210 of the format shown in FIG. 2. The buffer 210 may be implemented as a ROB (such as 112, FIG. 2). Memory system 502 may store instructions 510 and data 512 for controlling the operation of the processor 504.

Memory system 502 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 502 may store instructions 510 and/or data 512 represented by data signals that may be executed by processor 504. The instructions 510 may include bundled instructions as discussed herein.

In the preceding description, various aspects of a method and apparatus for NOP folding have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. An apparatus comprising:
a memory storage structure to hold a bundle of instructions;
a buffer, the buffer including an information field, the buffer further including a no-operation instruction (NOP) indicator field; and
folding logic circuit to place, responsive to a NOP in the bundle, a "present" value in the NOP indicator field.

2. The apparatus of claim 1, wherein:
the folding logic circuit is further to allocate the information field for a non-NOP instruction in the bundle.

3. An apparatus comprising:
a memory storage structure to hold a bundle of instructions;
a buffer, the buffer including an information field, the buffer further including a no-operation instruction (NOP) indicator field; and
folding logic circuit to place, responsive to a NOP in the bundle, a "present" value in the NOP indicator field;
the folding logic is to place, responsive to a first NOP in the bundle, a "present" value in the NOP indicator field; and
the folding logic is further to allocate the information field for a second NOP instruction in the bundle, responsive to all instructions in the bundle being NOP instructions.

4. The apparatus of claim 1, wherein:
the memory storage structure is a queue to hold a plurality of bundles.

5. The apparatus of claim 1, wherein:
the buffer is to hold a plurality of entries.

6. An apparatus comprising:
a memory storage structure to hold a bundle of instructions;
a buffer, the buffer including an information field, the buffer further including a plurality of NOP indicator fields, the number of NOP indicator fields being n−1, where n is the number of instructions in the bundle; and
folding logic to place, responsive to a NOP in the bundle, a "present" value in the NOP indicator field.

7. The apparatus of claim 6, wherein:
each of the plurality of NOP indicator fields corresponds to an instruction in the bundle; and
the folding logic is to place, responsive to each of a plurality of NOP instructions in the bundle, a "present" value in the NOP indicator field corresponding to the respective NOP instruction.

8. An apparatus comprising:
a memory storage structure to hold a bundle of instructions;
a buffer, the buffer including an information field, the buffer further including a no-operation instruction (NOP) indicator field; and
folding logic to place, responsive to a NOP in the bundle, a "present" value in the NOP indicator field;
wherein the buffer is to hold a plurality of entries; and
the information field of each buffer entry is to hold a result of an instruction in the bundle.

9. An apparatus comprising:
a memory storage structure to hold a bundle of instructions;
a buffer, the buffer including an information field, the buffer further including a no-operation instruction (NOP) indicator field; and
folding logic to place, responsive to a NOP in the bundle, a "present" value in the NOP indicator field;
wherein the buffer is to hold a plurality of entries; and
the information field of each buffer entry is to hold a decoded instruction.

10. An apparatus comprising:
a memory storage structure to hold a bundle of instructions;
a buffer, the buffer including an information field, the buffer further including a no-operation instruction (NOP) indicator field; and
folding logic to place, responsive to a NOP in the bundle, a "present" value in the NOP indicator field;
wherein the buffer is to hold a plurality of entries; and
the information field of each buffer entry is to hold a decoded micro-operation.

11. A method comprising:
determining, during execution of a bundle of instructions, a number x of no-operation (NOP) instructions in the bundle, the bundle having a plurality (n) of instructions, wherein $0 \leq x \leq n$;
allocating an entry in a buffer; and
providing, if x>0, a "present" value in an indicator field of the entry to specify a NOP instruction in the bundle.

12. The method of claim 11, wherein allocating further comprises:
if x=0, allocating a corresponding entry in the buffer for each of the n instructions.

13. A method comprising:
determining a number x of no-operation (NOP) instructions in a bundle, the bundle having a plurality (n) of instructions, wherein 0<x<n;
allocating an entry in a buffer;
providing, if x>0, a "present" value in an indicator field of the entry to specify a NOP instruction in the bundle; and
providing, if x=n, a "present" value in each of n−1 indicator fields of the entry to specify n−1 NOP instructions in the bundle.

14. A method comprising:
determining a number x of no-operation (NOP) instructions in a bundle, the bundle having a plurality (n) of instructions, wherein 0<x<n;
allocating an entry in a buffer; and
providing, if x>0, a "present" value in an indicator field of the entry to specify a NOP instruction in the bundle; and
if 0<x<n, allocating a corresponding entry in the buffer for each of the (n−x) non-NOP instructions in the bundle.

15. The method of claim 14, wherein providing further comprises:
providing, if 0<x<n, for each NOP instruction in the bundle a "present" value in a NOP indicator corresponding to the NOP instruction, the corresponding NOP indicator being included in one of the (n−x) allocated buffer entries.

16. A system, comprising:
a dynamic random access memory to store a bundle, the bundle including a plurality of instructions; and folding logic circuit to allocate a buffer entry for one of the instructions, wherein the buffer entry includes a NOP indicator field;

the folding logic circuit to place a "present" value in the NOP indicator field responsive to the presence of a NOP instruction in the bundle.

17. The system of claim 16, wherein folding logic circuit is further to allocate a buffer entry for a non-NOP instruction of the bundle.

18. The system of claim 16, wherein folding logic circuit is further to allocate a buffer entry for a NOP instruction of the bundle.

19. The system of claim 17, wherein the folding logic circuit is further to place a "present" value in the NOP indicator field responsive to the presence of a second NOP instruction in the bundle.

20. The system of claim 16, wherein:

the bundle includes n instructions;

the entry includes n−1 NOP indicator fields; and folding logic circuit is further to indicate the presence of a plurality x of NOP instructions in the bundle, wherein $2 \leq x \leq n-1$, by placing a "present" value in each of x indicator fields.

21. The system of claim 20, wherein:

folding logic circuit is further to place the "present" value for a selected one of the x NOP instructions into a selected one of the x indicator fields such that the selected indicator field maps to the location of the selected NOP instruction within the bundle.

* * * * *